Oct. 13, 1925.  
H. NEWTON  
1,557,081

HAND AND RIFLE GRENADE AND FUSE THEREFOR

Filed Nov. 17, 1917     4 Sheets-Sheet 1

INVENTOR  
Henry Newton  
BY  
ATTORNEY

Oct. 13, 1925. 1,557,081
H. NEWTON
HAND AND RIFLE GRENADE AND FUSE THEREFOR
Filed Nov. 17, 1917 4 Sheets-Sheet 2

INVENTOR
Henry Newton
BY
ATTORNEY

Oct. 13, 1925.  1,557,081
H. NEWTON.
HAND AND RIFLE GRENADE AND FUSE THEREFOR
Filed Nov. 17, 1917  4 Sheets-Sheet 3

INVENTOR
Henry Newton
BY
ATTORNEY

Oct. 13, 1925. 1,557,081
H. NEWTON
HAND AND RIFLE GRENADE AND FUSE THEREFOR
Filed Nov. 17, 1917 4 Sheets-Sheet 4

INVENTOR
Henry Newton
BY
ATTORNEY

Patented Oct. 13, 1925.

1,557,081

UNITED STATES PATENT OFFICE.

HENRY NEWTON, OF DERBY, ENGLAND.

HAND AND RIFLE GRENADE AND FUSE THEREFOR.

Application filed November 17, 1917. Serial No. 202,474.

(GRANTED UNDER THE PROVISIONS OF THE ACT OF MARCH 3, 1921, 41 STAT. L., 1313.)

*To all whom it may concern:*

Be it known that I, HENRY NEWTON, a subject of the King of Great Britain and Ireland, and residing at Market Place, Derby, in the county of Derby, England, have invented certain new and useful Improvements in Hand and Rifle Grenades and Fuses Therefor, of which the following is a specification.

This invention relates to improvements in hand and rifle grenades and other missiles and projectiles and in fuses therefor, and has for its object to devise such articles of a form which may be simply and cheaply constructed and which require no machining other than stamping and pressing while at the same time existing standard components may be utilized in their manufacture so that the output may be very considerably increased.

A further advantage of my invention lies in the fact that the destructive power of the grenades or the like is enhanced owing to the construction adopted whereby practically every portion becomes a useful missile or projectile and the functioning member acts without the necessity for deceleration of the projectile as a whole, and the devices are of so simple a construction that a minimum amount of time is necessary in order to train a man to become proficient in the useful employment of the same.

According to my invention I form the body of the grenade or the like from an unmachined casting, and I carry the striking mechanism for the device in or upon a stamped or pressed cap or fitting adjusted or secured upon the body casting.

The invention also comprises the particular forms of device hereinafter described or indicated.

The accompanying drawings illustrate several modes of carrying out my invention:—

Figure 1:
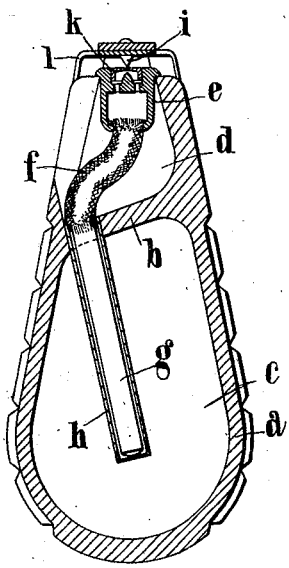
Figures 1 and 2 are respectively a sectional and an outside elevation showing one form of grenade in accordance with my invention.
Figure 2:
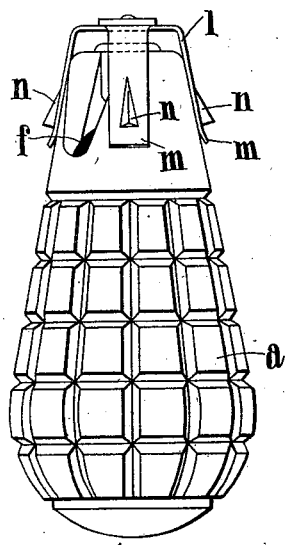

In carrying my invention into effect in one convenient manner as, for example, in its application to the production of a hand grenade and as illustrated in Figures 1 and 2, I make the body portion $a$ of my grenade in the form of an unmachined casting such as cast iron of any desired size and shape, the casting being divided into two parts by a web or partition $b$ so that the lower portion $c$ may be filled with the usual explosive charge while in the upper part $d$ I arrange an ordinary standard blank rifle cartridge $e$ cut down and having its lower end crimped or otherwise secured upon a Bickford or like standard time fuse $f$. The lower end of the fuse is secured in any suitable manner to a detonator $g$ of any usual standard form which is preferably arranged in a waxed paper cylinder $h$ projecting into the lower portion of the grenade body and fitted into a hole formed or provided in the web $b$.

The striker pin $i$ for the fulminate cap $k$ in the cartridge $e$ is formed in one with or secured in any suitable manner to a pressed or stamped metal cap or fitting $l$ which may have a plurality of tongues $m$ or projecting portions having openings therein adapted to engage with lugs or projections $n$ upon the casting $a$, or the tongues may be formed with projections adapted to engage recesses in the casting although it will be understood that the pressed or stamped metal cap or fitting may be secured to the unmachined casting forming the body of the missile in any suitable manner.

Figure 3:
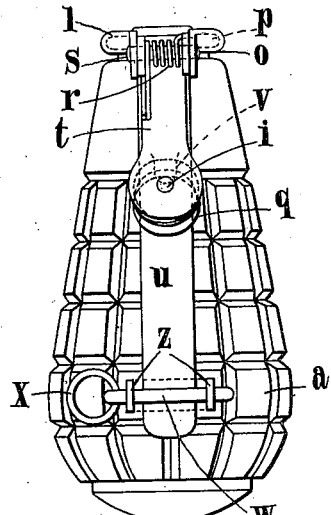
Figures 3, 4 and 5 are respectively an elevation, sectional elevation and plan of a modified form of grenade.
Figure 4:
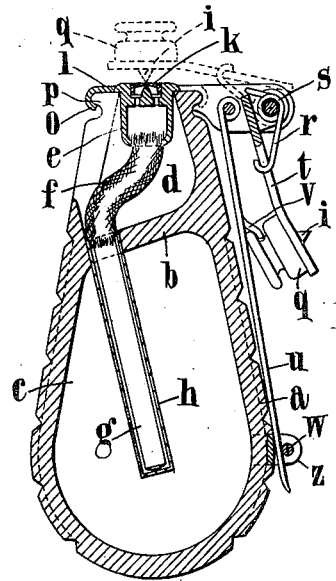
Figure 5:
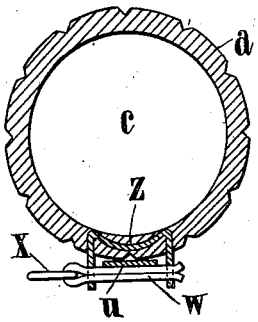

In a modified form of construction of hand grenade in accordance with the invention illustrated in Figures 3 to 5, I may as before employ an unmachined casting *a* forming the body, and I may provide therein a standard rifle blank cartridge *e* cut down and secured to the fuse *f* as above described while the pressed or stamped metal cap or fitting *l* is provided with flanged edges *o* and is adapted to engage a rim *p* in the upper portion of the grenade body *a*. The cap or fitting carries a hammer *q* having a striking point *i* thereon adapted to be operated by a coil spring *r* arranged round a pin *s* in the cap or fitting *l* upon which the hammer lever or shaft *t* is pivoted, and in combination with such an arrangement I provide a lever *u* also pivoted to the cap and having a projection *v* thereon adapted when required to engage a recess or projection upon the hammer so as to retain the latter in its cocked position. The lower end of the lever is adapted to be kept in place until it is required to be released by means of a safety pin *w* having a ring or other attachment *x* thereon and adapted to pass through a stirrup or like fitting *z* which is preferably cast with the grenade body (and may then conveniently form a chaplet for supporting the core during the casting operation) or which may be secured to the grenade body in any other suitable manner.

Figure 6:
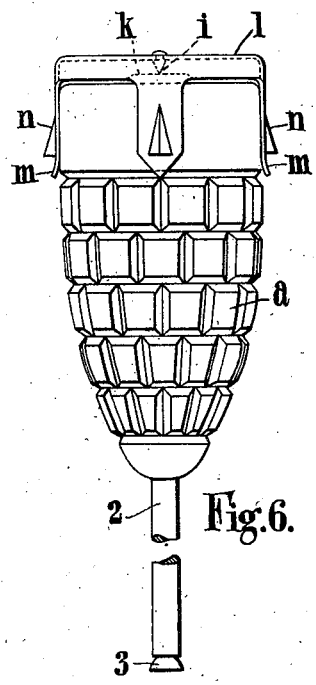
Figures 6 and 7 show a further modified form of grenade.
Figure 7:
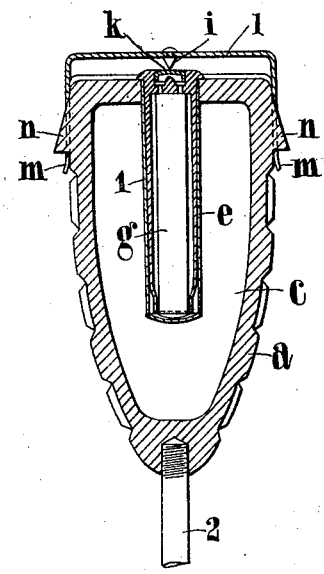

When applying my invention to the production of a rifle grenade as shown, for example, in Figures 6 and 7, I adopt the same general construction of unmachined body casting *a* and stamped or pressed metal cap or fitting *l* carrying the striker pin *i*, and I arrange the cartridge *e* within a cylinder 1 projecting into the interior of the grenade body—the latter being formed in this case with one interior chamber only—and the detonator is fixed into the cartridge. The lower portion of the grenade is provided with the usual steel rod 2 by means of which it is propelled from the rifle and at the lower end of the rod I provide a copper gas check 3 (Figure 6) shaped after the manner of a pump cup leather so that when the rifle is fired the gas check "sets up" into the bore of the rifle, and it is not therefore necessary that the steel rod should be an accurate fit therein.

Figure 8:
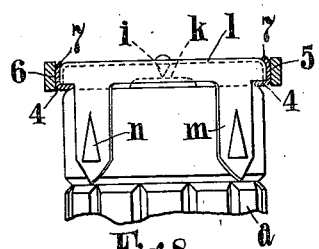
Figures 8, 9 and 10 are views illustrating a still further modification.
Figure 9:
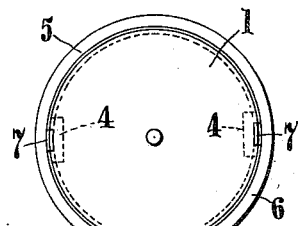
Figure 10:
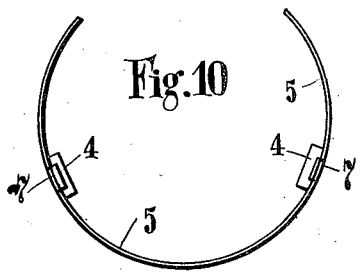

Figures 8 to 10 show a further modification in which, as before, the unmachined grenade body *a* is fitted with a pressed or stamped fitting *l* having the striker pin *i*, the latter being held up by reason of the cap being supported upon lugs 4 of a spring ring 5 normally held in position by an inertia ring 6. The latter flies forward when the grenade strikes an object, allowing the ring 5 to assume the position shown in Figure 10, whereupon the striker pin *i* is free to come into contact in the usual manner with the detonator. The spring ring may have slight inward propections as 7 to attach it to the striker cap until the inertia ring has fallen clear.

Figure 11:
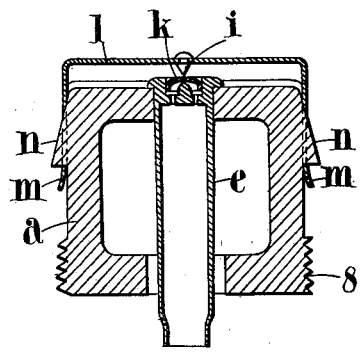
Figures 11 and 12 are sectional views illustrating two forms of fuse in accordance with the invention.

The same general construction may be adopted in connection with instantaneous or delay action fuses, an example being shown in Figure 11 in which the cast iron body *a* is fitted as before with standard cartridge *e* and detonator, and a stamped or pressed metal cap or fitting *l* carrying the striker *i*, the lower part of the body portion *a* being screw-threaded as at 8 to fit existing types of bombs, shells or other projectiles.

Figure 12:
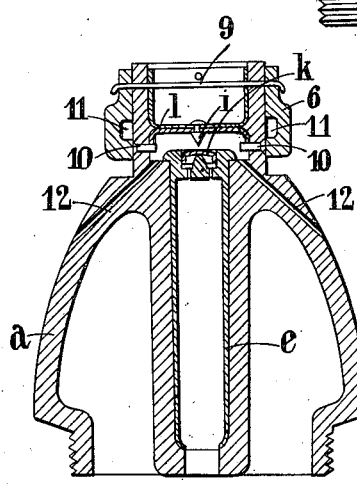

Figure 12 shows a modified form of fuse in which the striker pin is held away from the detonator by a shearing pin or wire 9 and centrifugal pins 10. Under the influence of shock the pin or wire 9 is sheared, releasing the inertia ring 6 which, in turn, releases the centrifugal pins 10 when the latter are opposite the groove or recesses 11 in the inertia ring, and it will be understood that a similar arrangement may be provided for any of the grenades hereinbefore described. Apertures 12 may be provided to equalize the pressure on both sides of the striker cap.

Figure 13:
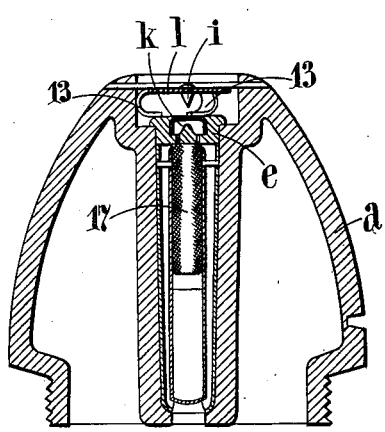
Figures 13 and 14 are views of modified forms of fuse.
Figure 14:
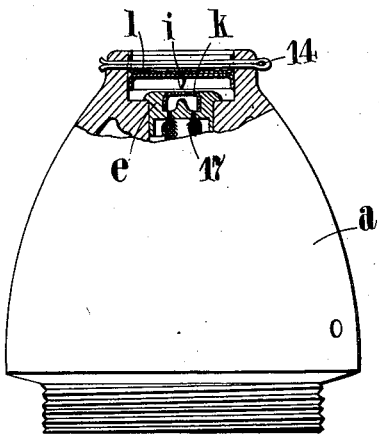
Figure 17:
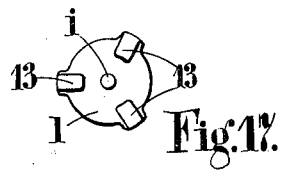
Figure 17 is a plan of a detail shown in Figure 13.

Figures 13 and 14 show two forms of fuse in which the striker pin is kept away from the detonator during the period of acceleration, in the first case by lugs or feet 13 resting on the cartridge and in the second case by the pin 14.

Figure 15:
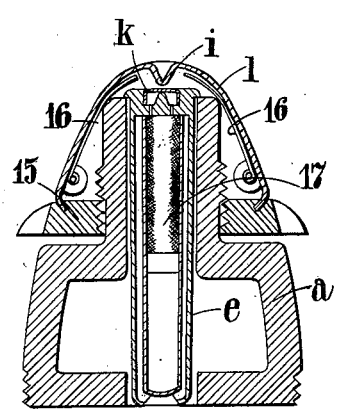
Figures 15 and 16 show a still further modification in two positions.
Figure 16:
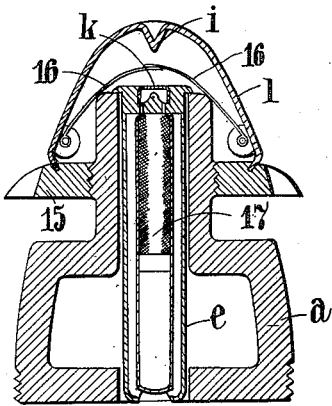
Figure 18:
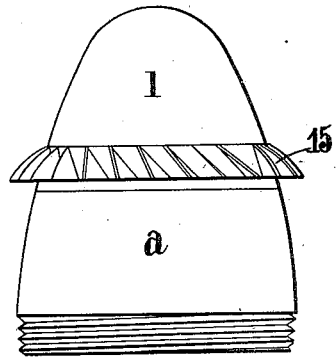
Figure 18 is an outside elevation of the fuse shown in Figures 15 and 16.

Figures 15, 16 and 18 show a form in which the pressed or stamped fitting *l* is secured to a vaned member 15, while two curved arms 16 are pivoted to the cap or fitting *l* so that in the normal position shown in Figure 16 the arms are interposed and form a safety device between the striker and detonator. During the flight of the projectile the vaned member is screwed down into the position shown in Figure 15 so that the device is "cocked" or put into position for exploding on percussion.

Figure 19:
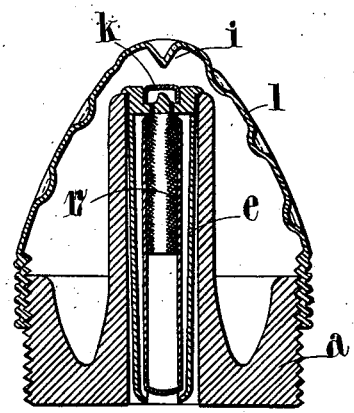
Figures 19 and 20 are two views illustrating a further modified form of fuse.
Figure 20:
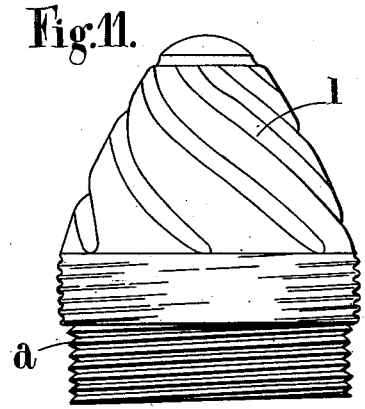
Figure 21:
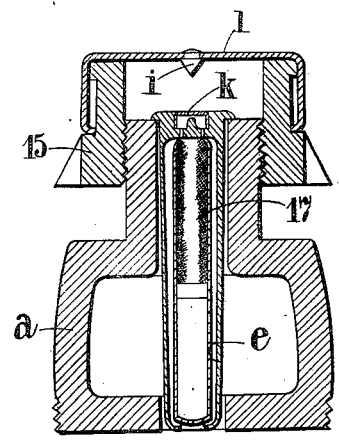
Figure 21 shows a still further modification.

Figures 19 and 20 and Figure 21 show two modified forms of fuse, the construction of which will be evident without further description.

In any modification of my invention I may, where desired, as for example in the devices shown in Figures 7 and 11, introduce a rubber pad or like compressible member between the cap and the body portion to prevent the striker from contacting with the detonator during the period of acceleration, or I may house the detonator in rubber for the same purpose. I may also, if desired, arrange to protect the striker mechanism normally by means of a cap or cover which will fall off during flight and allow the functioning member to act.

When it is desired to produce a delay action fuse a piece of Bickford or other slow burning fuse or composition 17 is placed in the standard cartridge between the black powder charge and the flash holes from the fulminate cap. In the case of high muzzle velocity fuses the detonator may be housed in rubber or the like to prevent the shock of discharge from affecting the fulminate.

In one convenient construction the striker member may comprise two cup-shaped members arranged back to back and held together by a striker point and combined with a shearing wire conveniently mounted in a tube within which the striker cup moves and which, with the striker cups, may be removed for inserting the detonator in position. A safety pin passes through both cup and tube and also the safety cap, when such is used, and springs may be employed if necessary to force the latter off during flight.

I desire it to be understood that the foregoing details of construction are given by way of example only and may be suitably modified to suit the type and construction of grenade, bomb, shell or other projectile or missile that is to be provided for the purposes for which it is to be employed or other practical requirements which the invention may be called on to fulfill.

Having now described my invention, what I claim as new and desire to secure by Letters Patent is:—

1. In a projectile, the combination of a body casting, an external sheet metal cap on said body, a striker pin carried by said cap, a standard blank rifle cartridge adapted to co-operate with said striker pin and means for securing the said external sheet metal cap to said body.

2. In a projectile, grenade, fuse or the like, an unmachined hollow body of cast metal, a sheet metal cap having apertures therein, lugs upon said body upon which the apertures of the cap are adapted to fit to secure the cap removably upon said body, a striker pin carried by said cap and firing means comprising a standard blank rifle cartridge adapted to co-operate with said striker pin.

3. In a projectile an unmachined hollow body of cast metal, a sheet metal cap fitting thereon, means for securing said cap to said body without machining, a striker pin carried by said cap, and a fulminate cap within said hollow body.

4. In a projectile an unmachined hollow body of cast metal, a sheet metal cap having apertures therein, a striker pin carried by said cap, a detonator in said body, and lugs upon said body adapted to engage said apertures in the cap to prevent movement of the cap from but not toward said body.

In testimony whereof I have signed my name to this specification.

HENRY NEWTON.